Patented Mar. 22, 1949

2,464,949

UNITED STATES PATENT OFFICE 2,464,949

PARACHUTE CONTROL MEANS FOR PROJECTILES

George S. Smith, San Diego, and William H. Hunt, National City, Calif., assignors of one-third to Isabelle Smith, San Diego, Calif.

Application March 2, 1946, Serial No. 651,518

11 Claims. (Cl. 244—152)

Our invention relates to a parachute control means for projectiles and the objects of our invention are:

First, to provide a parachute control of this class which may be propelled in connection with various projectiles and which will slowly lower the projectile to the ground after its velocity is spent.

Second, to provide a parachute control means of this class which is particularly adapted for use in connection with arrows or the like for slowly lowering the same to the ground after having been shot into the air.

Third, to provide a parachute control means of this class which may be used as a toy if desired, whereby arrows may be safely shot into the air and automatically slowly lowered to the ground by the controlling parachute.

Fourth, to provide a parachute control means of this class which is equally useful in controlling the descent of arrows as well as darts or the like.

Fifth, to provide a parachute control means of this class in which a compression spring is compressed by the air dynamic resistance of the parachute when passing through the air and which extends itself when the air dynamic resistance of the parachute is decreased due to loss of velocity whereby the extension of said spring releases the closed end of said parachute from said control means permitting the parachute to open and slowly lower the control means to the ground.

Sixth, to provide a parachute control means of this class which is very simple and economical of construction, efficient in operation and which will not readily deteriorate or get out of order.

With these and other objects in view as will appear hereinafter, our invention consists of certain novel features of construction, combination and arrangement of parts and portions as will be hereinafter described in detail and particularly set forth in the appended claims. Reference being had to the accompanying drawings and to the characters of reference thereon, forming a part of this application in which Figure 1 is a side elevational view of our parachute control means for projectiles as shown in connection with fragmentary portions of a projectile; Figure 2 is an enlarged fragmentary sectional view taken from the line 2—2 of Figure 1; Figure 3 is an enlarged fragmentary transverse sectional view taken from the line 3—3 of Figure 2; Figure 4 is a side elevational view of a modified form of our parachute control means for projectiles shown in connection with a fragmentary portion of a projectile; Figure 5 is an enlarged fragmentary sectional view taken from the line 5—5 of Figure 4 and Figure 6 is a fragmentary end view taken from the line 6—6 of Figure 5.

Similar characters of reference refer to similar parts and portions throughout the several views of the drawings.

The parachute 1, shaft 2, latch members 3, release cam 4, spring 5, yoke 6 and the cords 7 and 8 constitute the principle parts and portions of our parachute control means for projectiles.

As shown in Figure 1 of the drawings, the parachute 1 is provided with a closed end portion 1—a connected to the cord 7. The skirt of the parachute 1 is provided with shroud cords 1b connected to the cord 8. Cord 8 is connected to the shaft 2 secured in one end of the latch member 3 in the hollow bore portion 3a thereof, as shown best in Figure 2 of the drawings. The opposite end of the cord 7 from the closed end of the parachute 1 is connected to the yoke 6 which is preferably made of wire or other rigid material. Yoke 6 as shown in Figure 1 of the drawings is substantially triangular in form and may be varied as desired into rectangular or other forms in order to accommodate the tongue 3a of the latch member 3 over which the closed end portion 6a of the yoke 6 is positioned as shown best in Figures 1 and 2 of the drawings. The yoke 6 engages the releasing cam 4 and rests upon the inclined surface 4a thereof and tends to reciprocate the releasing cam 4 on the outer side of the latch member 3 against compression of the spring 5 when an erodynamic load is creating the drag in connection with the parachute 1. The latch member 3 is provided with a substantially U-shaped opening 3b therein defined by opposite side walls 3c and 3d of the latch member 3 together with the intermediate projection 3j integral with the plug portion 3e secured in the tubular portion of the latch member 3 by the pin 3f. It will be noted that the substantially U-shaped opening is enclosed by the side portion 3d of latch member 3 and communicates with an open portion 3g at the opposite side of the latch member 3 all as shown best in Figure 2 of the drawings. It will be noted that the inclined relationship of the surface 4a of the releasing cam 4 extends away from the projection 3j toward the open side 3c of the latch member 3, thus the angular surface 4a extends angularly away from the open side of the U-shaped opening 3b in the latch member 3. The shafts 2 are secured in opposite bore portions 3a and 3h of the latch member 3 as shown best in Figure 2 of the drawings. The shaft 2 in the bore portion 3h as shown in Figure 2 of the drawings is provided with a notched portion 2a adapted to be engaged by a dart throwing string or the like. The shaft 2 in the bore portion 3h is at the forward end of the parachute control mechanism. It will be noted that the spring 5 forces the releasing cam 4 toward the forward end of the parachute control mechanism whereby the angularly disposed surface 4a of the releasing cam 4 is forced toward the open end of the U-shaped opening 3b as indicated by dash lines in Figure 2 of the drawings.

The operation of our parachute control means for projectiles is substantially as follows:

The parachute 1 in connection with the cords 7 and 8 is positioned at the rear portion of the parachute control mechanism. The enclosed end portion 6a of the yoke 6 is positioned intermediate the projection 3j and the side 3d of the latch member 3 as indicated by dash lines in Figure 2 of the drawings. In this position the yoke 6 is maintained intermediate the projection 3j and the side 3d by the compression spring 5 tending to hold the releasing cam 4 in the dash line position as shown in Figure 2 of the drawings. The notched portion 2a in the forward shaft 2 is then engaged by a conventional dart throwing string and the parachute control mechanism together with the parachute 1 and the shaft 2 are propelled through the air. The aerodynamic load of the parachute 1 forces the releasing cam 4 longitudinally of the latch member 3 compressing the spring 5 whereupon the yoke 6 passes beyond the end of the projection 3j and assumes approximately the solid line position as shown in Figure 2 of the drawings. As the velocity of the shafts 2 together with the parachute control mechanism decreases, the aerodynamic load on the parachute 1 decreases permitting the spring 5 to force the releasing cam forwardly. It will be noted that the angular relationship of the surface 4a of this releasing cam 4 is so arranged that the yoke 6 slides backwardly and laterally of the projection 3j when the aerodynamic load is first applied to the parachute 1. This lateral movement of the yoke 6 positions the same in the solid line position as shown in Figure 2 of the drawings whereupon the forward movement of the releasing cam 4 caused by the compression spring 5 forces the yoke 6 directly toward the opening 3g in the side 3c of the latch member 3. As the velocity of the shaft 2 is spent the yoke 6 assumes the dash line position at the opening 3g of the latch member 3 whereupon the closed end 1a of the parachute 1 is permitted to follow the open end thereof causing the parachute to open and suspend the shaft 2 together with the parachute control mechanism whereby the shafts 2 and parachute control mechanism is slowly lowered to the ground. It will be here noted that the enclosed end of the U-shaped opening 3b in the latch member 3 is angularly disposed backwardly and laterally of the latch member 3 on substantially the same plane as the angular surface 4a of the releasing cam 4, all as shown best in Figure 2 of the drawings. This angular portion 3k provides a cam surface on which the end portion 6a of the yoke 6 travels laterally when the drag in connection with the parachute 1 exceeds the force to compress the spring 5 beyond the inclined end portion 3k of the U-shaped opening 3b, all as shown best in Figure 2 of the drawings.

The modification as shown in Figures 4, 5 and 6 of the drawings is particularly useful in connection with arrow shafts or the like which may be shot from a bow or other propelling device.

The parachute 9, shaft 10, latch member 11, releasing cam 12, spring 13, yoke 14 and the cords 15 and 16 constitute the principal parts and portions of the modified form of our parachute control means for projectiles, all as shown best in Figures 4, 5 and 6 of the drawings.

The parachute 9 as shown in Figure 4 of the drawings is substantially the same as the parachute 1 hereinbefore described in connection with Figures 1 to 3 inclusive. The shaft 10 is preferably an arrow shaft having a notched portion 10a in its normally rear end as shown best in Figure 4 of the drawings. This shaft 10 is secured in the hollow cylindrical bore portion 11a of the latch member 11 which is provided with a substantially flat plate like latch portion 11b at its opposite end through which extends the stop pin 11c engageable with the cam end portion 12a of the releasing cam 12. It being noted that the stop pin 11c limits the longitudinal movements of the releasing cam 12 on the latch member 11 in the same manner in which the stop member 3m limits the longitudinal movement of the releasing cam 4 as shown in Figure 2 of the drawings. It will be noted that the releasing cam 12 is substantially the same in form and operation as the releasing cam 4a as shown in Figure 2 of the drawings. The substantially flat plate like latch portion 11b is provided with a U-shaped slotted portion 11d therein open at one side portion 11e. The normally rear end portion 11f of this slotted portion 11d is inclined backwardly and laterally toward the open side portion 11e, all as shown best in Figure 5 of the drawings. The projecting portion 11g at the middle of the U-shaped slotted portion 11d operates substantially in the same manner as the projection portion 3j of the structure as shown in Figure 2 of the drawings. The spring 13, as shown in the modification of Figure 5 of the drawings, is substantially the same as the spring 5 as shown in Figures 1 to 3 inclusive. The yoke 14 is substantially the same in construction and operation as the yoke 6 shown in Figures 1 to 3 inclusive of the drawings. The cords 15 and 16 in connection with the parachute 9 operate substantially in the same manner as the cords 8 and 7 respectively of the structure disclosed in Figures 1 to 3 of the drawings. It will be noted that the substantially flat latch portion 11b is restrained against rotation in the slotted portion 12b of the releasing cam 12 through which said latch portion 11b extends as shown best in Figures 5 and 6 of the drawings.

Specifically the operation of the modified form as shown in Figures 4 to 6 inclusive is substantially as follows: when the shaft 10 is shot from a bow or similar device the yoke 14 is positioned in the dash line position at the enclosed side of the projection 11g, whereupon the yoke 14 is forced backwardly and laterally beyond the projection 11g by the aerodynamic load imposed on the parachute 9. As the load on the parachute decreased due to dissipation of velocity of the shaft 10, the spring 13 overcomes the reduced drag in connection with the parachute and forces the releasing cam 12 forwardly carrying with it the yoke 14 whereupon the yoke 14 is transferred to the open portion 11e at the opposite side of the projection 11g releasing the enclosed end 9a of the parachute 9 permitting the same to open and slowly lower the shaft 10 and parachute control means to the ground.

Though we have shown and described a particular construction, combination and arrangement of parts and portions and certain modification, we do not wish to be limited to the particular construction, combination and arrangement or to the modification, but desire to include in the scope of our invention the construction, combination and arrangement substantially as set forth in the appended claims.

Having thus described our invention what we claim as new and desire to secure by Letters Patent is:

1. In a parachute control means for projectiles of the class described, the combination of a parachute, a yoke connected to said parachute at its canopy at the outer side thereof, a latch member having a slotted portion therein adapted to receive said yoke, said parachute having shroud cords in connection with said latch member, a hollow cylindrical releasing member in connection with said latch member engageable with said yoke and a spring tending to force said releasing member axially of said projectile toward the open end of said slotted portion for relieving said yoke from said latch member.

2. In a parachute control means for projectiles of the class described, the combination of a parachute, a yoke connected to said parachute at its canopy at the outer side thereof, a latch member having a slotted portion therein adapted to receive said yoke, said parachute having shroud cords in connection with said latch member, a hollow cylindrical releasing member in connection with said latch member engageable with said yoke and a spring tending to force said releasing member axially of said projectile toward the open end of said slotted portion for relieving said yoke from said latch member, said slotted portion of said latch member being substantially U-shaped and having an inclined end portion extending backwardly thereof.

3. In a parachute control means for projectiles of the class described, the combination of a parachute, a yoke connected to said parachute at its canopy at the outer side thereof, a latch member having a slotted portion therein adapted to receive said yoke, said parachute having shroud cords in connection with said latch member, a hollow cylindrical releasing member in connection with said latch member engageable with said yoke and a spring tending to force said releasing member axially of said projectile toward the open end of said slotted portion for relieving said yoke from said latch member, said slotted portion of said latch member being substantially U-shaped and having an inclined end portion extending backwardly thereof, said hollow cylindrical releasing member having an angular engaging surface extending backwardly and laterally of said U-shaped slotted portion.

4. In a parachute control means for projectiles of the class described, the combination of a latch member having a slotted portion therein open at one side thereof, a parachute having means in connection with the canopy at the outer side thereof engageable with said slotted portion of said latch member, a hollow cylindrical releasing member reciprocally mounted in connection with said latch member and engageable with said means connected to said canopy of said parachute, resilient means engaging said releasing member tending to force the same longitudinally of said latch member toward the open end of said slotted portion.

5. In a parachute control means for projectiles of the class described, the combination of a latch member having a slotted portion therein open at one side thereof, a parachute having means in connection with the canopy at the outer side thereof engageable with said slotted portion of said latch member, a releasing member reciprocally mounted in connection with said latch member and engageable with said means connected to said canopy of said parachute, resilient means engaging said releasing member tending to force the same longitudinally of said latch member toward the open end of said slotted portion, said parachute having shroud connection means securing the same to said latch member.

6. In a parachute control means for projectiles of the class described, the combination of a latch member having a slotted portion therein open at one side thereof, a parachute having means in connection with the canopy at the outer side thereof engageable with said slotted portion of said latch member, a releasing member reciprocally mounted in connection with said latch member and engageable with said means connected to said canopy of said parachute, resilient means engaging said releasing member tending to force the same longitudinally of said latch member towards the open end of said slotted portion, said parachute having shroud connection means securing the same to said latch member, shaft means in connection with said latch member.

7. In a parachute control means for projectiles of the class described, the combination of a latch member having a slotted portion therein open at one side thereof, a parachute having means in connection with the canopy at the outer side thereof engageable with said slotted portion of said latch member, a releasing member reciprocally mounted in connection with said latch member and engageable with said means connected to said canopy of said parachute, resilient means engaging said releasing member tending to force the same longitudinally of said latch member toward the open end of said slotted portion, said parachute having shroud connection means securing the same to said latch member, shaft means in connection with said latch member, said shaft means having a notched portion therein arranged to be engaged by a propelling means.

8. In a parachute control means for projectiles of the class described, the combination of a latch member having a substantially U-shaped opening therethrough enclosed at one end and open at the other end laterally of said latch member, said slotted portion defined by an angular portion of said latch member at its middle portion extending backwardly and laterally of said latch member, a releasing cam reciprocally mounted in connection with said latch member and having an inclined engaging surface extending backwardly of said latch member toward the open end of said slotted portion, a spring in connection with said latch member and said releasing cam tending to force said releasing cam toward the open end of said slotted portion.

9. In a parachute control means for projectiles of the class described, the combination of a latch member having a substantially U-shaped opening therethrough enclosed at one end and open at the other end laterally of said latch member, said slotted portion defined by an angular portion of said latch member at its middle portion extending backwardly and laterally of said latch member, a releasing cam reciprocally mounted in connection with said latch member and having an angular inclined engaging surface extending backwardly of said latch member toward the open end of said slotted portion, a spring in connection with said latch member and said releasing cam tending to force said releasing cam toward the open end of said slotted portion, a parachute having shroud cords connected with said latch member, a yoke in connection with the canopy of said parachute engageable with said U-shaped slotted portion of said latch member.

10. In a parachute control means for projectiles of the class described, the combination of a latch member having a substantially U-shaped opening therethrough enclosed at one end and open at the other end laterally of said latch member, said slotted portion defined by an angular portion of said latch member at its middle portion extending backwardly and laterally of said latch member, a releasing cam reciprocally mounted in connection with said latch member and having an angular inclined engaging surface extending backwardly of said latch member toward the open end of said slotted portion, a spring in connection with said latch member and said releasing cam tending to force said releasing cam toward the open end of said slotted portion, a parachute having shroud cords connected with said latch member, a yoke in connection with the canopy of said latch member, and shaft means in connection with said latch member.

11. In a parachute control means for projectiles of the class described, the combination of a parachute, a yoke connected to said parachute, a latch member having a slotted portion therein adapted to receive said yoke, a releasing member in connection with said latch member axially of said projectile engageable with said yoke and a spring tending to force said releasing member toward the open end of said slotted portion for releasing said yoke from said latch.

GEORGE S. SMITH.
WILLIAM H. HUNT.

REFERENCES CITED

The following references are of record in the file of this patent:

UNITED STATES PATENTS

| Number | Name | Date |
|---|---|---|
| 1,178,304 | Dutcher | Apr. 4, 1916 |
| 1,359,207 | Tyrrell | Nov. 16, 1920 |
| 1,780,734 | Anderson | Nov. 4, 1930 |
| 2,397,694 | Sargent | Apr. 2, 1946 |

FOREIGN PATENTS

| Number | Country | Date |
|---|---|---|
| 107,269 | Switzerland | Oct. 23, 1923 |